United States Patent [19]

Altoz et al.

[11] 3,957,107

[45] May 18, 1976

[54] THERMAL SWITCH

[75] Inventors: Frank E. Altoz, Baltimore; Richard F. Porter, Millersville, both of Md.

[73] Assignee: The United States of America as represented by the Secretary of the Air Force, Washington, D.C.

[22] Filed: Feb. 27, 1975

[21] Appl. No.: 553,700

[52] U.S. Cl. .................................. 165/32; 154/105; 174/15 HP; 357/82
[51] Int. Cl.² ..................... F28D 15/00; G05D 23/00
[58] Field of Search .......... 165/32, 105; 174/15 HP; 357/82

[56] References Cited
UNITED STATES PATENTS

| | | | |
|---|---|---|---|
| 3,225,820 | 12/1965 | Riordan | 165/32 X |
| 3,399,717 | 9/1968 | Cline | 165/32 |
| 3,430,455 | 3/1969 | Stuart et al. | 165/32 X |

*Primary Examiner*—Albert W. Davis, Jr.
*Attorney, Agent, or Firm*—Joseph E. Rusz; Robert Kern Duncan

[57] ABSTRACT

A sealed extensible bellows containing freon and a flexible wick provide a heat pipe, and fixed end of which is attached to a heat sink (a cold body), the other movable end of the bellows carries a thermally conductive plate that moves from a nonengaging relationship to an engaging relationship with a temperature regulated surface at a predetermined temperature of the cold body.

2 Claims, 2 Drawing Figures

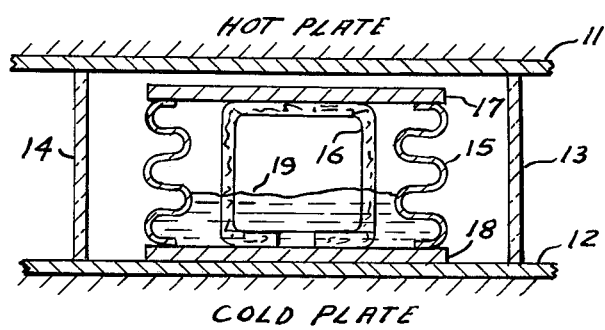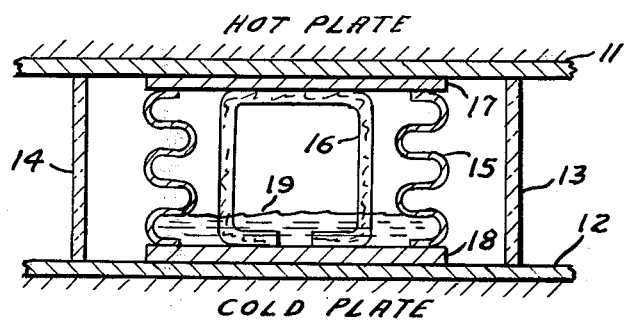

3,957,107

THERMAL SWITCH

RIGHTS OF THE GOVERNMENT

The invention described herein may be manufactured and used by or for the Government of the United States for all governmental purposes without the payment of any royalty.

BACKGROUND OF THE INVENTION

The field of the invention is in the art of temperature control devices.

Thermal switches transferring heat energy from a higher temperature body (a hot body) to a lower temperature body (a cold body, or a heat sink) are well known. U.S. Pat. No. 3,399,717 to patentee R. E. Cline is an example of a state of the art thermal switch.

In many applications equipment, such as electronic devices, must be maintained at or very close to a specified temperature to operator satisfactorily. For example, it is necessary to utilize a close temperature control on oscillator units which generate frequency bands extremely narrow in range. These accurate signals must be maintained over the full operating temperature range of the equipment. Thus, the selected control point is above the maximum anticipated operating temperature. 125°C is a typical value often utilized. For present equipment, however, this upper temperature is very nearly the maximum temperature at which the circuitry is capable of operating reliably. It is desirable to get the electronic equipment up to the designed operating temperature rapidly and quite frequently the heat sink is cold or considerably below this temperature. Under the conditions of a relatively wide temperature difference between the temperature controlled body and the heat sink (or cold body) it is desirable to have minimal thermal coupling so as to reduce the heater load and provide a fast warm-up to temperature. Conventional thermal switches actuated by the temperature of the controlled temperature body cooperating with the conventional proportional heaters within the oscillator can adequately take care of the normal temperature variations and provide satisfactory control. However, under an emergency such as during a dash manuever of an aircraft the cold plate (heat sink) temperatures may momentarily rise quite high so as to approach or even exceed 110°C. Under these conditions the conventional couplings to the heat sink are inadequate and the controlled temperature of the electronics exceed the maximum design temperature of 125°C, the cooling system of the electronic equipment is no longer effective, and the electronic equipment is susceptible to failure at a time it is most urgently needed. When the temperature of the cold plate rises to within approximately 15°C of the controlled temperature point, (typically 125°C), the efficiency of the conventional thermal cooling system is greatly decreased and to provide approximately the same effective cooling requires approximately a thermal impedance reduction by a factory of three between the controlled temperature body and the cold body. Prior to this invention a system having a low thermal impedance at high temperatures of the heat sink and yet provide a large thermal impedance at low and normal temperatures of the heat sink so as to provide rapid warm-up and the minimum of structures and temperatures control equipment has been unknown.

SUMMARY OF THE INVENTION

A thermal switch is provided which changes the thermal impedance between a source and a sink from an extensively high value at temperatures below a pre-set value of temperature of the sink to a negligible (very small) impedance at temperatures of the sink above the pre-set temperature. The switch is small, self-contained, and requires no external connections or power sources. It provides for a low power requirement fast warm-up of electronic equipment and prevents the exceeding of maximum temperatures by providing a low impedance thermal path to the heat sink as the temperature of the sink approaches the control temperature.

BRIEF DESCRIPTION OF THE DRAWINGS

FIG. 1 is a cross section schematic drawing of an embodiment of the invention when a low temperature heat sink condition is present; and FIG. 2 is a cross section schematic drawing of an embodiment of the invention when a high temperature heat sink condition is present.

DESCRIPTION OF THE PREFERRED EMBODIMENT

A typical embodiment of the invention is shown schematically in FIGS. 1 and 2. A typical specific operating embodiment of the invention will be described in detail for illustrative purposes, and those skilled in the art will readily modify the details of the device for their applications all within the scope of the contemplated invention.

The equipment that is temperature controlled is thermally attached to the plate 11. As previously mentioned, this may be an oscillator circuit and in which instance the plate 11 is referred to as the oscillator control plate. The plate 12 is a heat sink, commonly referred to as a cold plate. The cold plate may be the skin of an aircraft, or integral with the skin; or it may be the wall of a heat exchanger that has impact or forced air flowing over it to carry the heat away. It may also be a large finned member for radiating heat to the ambient air. Heat sinks, their geometries, and functions are well known and need not be further described. The temperature controlled plate 11 is supported on the cold plate 12 in a conventional manner by conventional heat insulating standoff support members 13 and 14. Fiberglas or similar thermal insulating material is suitable material from which to fabricate the support members and conventional bonding of the supports to the surfaces of members 11 and 22 may be used. The expansible bellows 15 in this particular embodiment being described for illustration is approximately 1.5 inches in diameter. The separation between members 11 and 12, i.e., the length of the stand-off supports 13 and 14, is approximately 0.25 inches. Generally three or more support members will be used to support the equipment plate 11. The number and shape of the support members are not critical. In some instances it may be desirable that the support be ring or boxed shaped. It is desirable that the support member, or members, utilized not be more massive than required for physical strength in order to minimize the thermal coupling between members 11 and 12 through the supporting means.

The material from which the bellows 15 is fabricated is not critical. Stainless steel or aluminum is a suitable material, with aluminum being generally preferable for economical reasons. The bellows 15 has plate 17 attached at one end and plate 18 attached at the other. Aluminum is also the generally preferred material from which to fabricate the plates. The plates 17 and 18 are brazed, or bonded with a suitable conventional cement, to the bellows 15. Prior to sealing the bellows assembly with the end plates a flexible wick 16 is positioned within the bellows and brazed to the top end plate 17 and the bottom end plate 18. Either metal or glass cloth is a suitable wick material with aluminum cloth being generally the preferred material. The bottom plate 18 of the bellows assembly is rigidly attached, so as to provide a low thermal impedance connection, with the cold plate radiator 12. Brazing or bolting (with the bolt holes outside the bellows) is suitable for attaching plate 18 to the heat sink (cold plate) 12. The bellows has a conventional evacuation and filling tube (not shown) brazed within the bellows assembly. In the specific embodiment being described in detail, the bellows assembly is evacuated to approximately $10^{-6}$ mm Hg absolute and approximately 2 cc of refrigerant 19, (freon type F-113 is suitable) is inserted. This amount represents approximately a 25 percent fill. At normal room temperature (25°C) and pressure the freon within the bellows is at approximately 6.5 PSIA (saturated) and the top plate 17 is approximately 0.02 inches from the temperature controlled plate 11, as shown representatively in FIG. 1.

As heat enters the bellows assembly, mainly from the cold plate through plate 18, more liquid 19 vaporizes, the bellows extends, and the top plate 17 is forced into engagement with plate 11. Plate 11 being at a higher temperature than plate 12, heat is transferred from plate 11 to plate 12. The wick 16 is the conduit, by capillary fluid flow, for the liquid in the process of evaporation at the hot surface (plate 17) and condensation at the colder surface (plate 18). Typically, and in the embodiment being described, when the cold plate 18 and the sink 12 reach a temperature of approximately 110°C the pressure within the bellows becomes approximately 80 PSIA, and contact is made between plates 17 and 11. This is illustrated in FIG. 2. The temperature of the hot plate 11 is at approximately 125°C, the design temperature for the electronics. This further raises the temperature in the bellows as the top plate of the bellows 17 assumes the 125°C temperature of the electronic equipment. It may now be stated that the thermal switch through a temperature rise of the heat sink has anticipated a decrease in the normal (conventional) cooling of the electronics. Without the device of the invention the temperature rise of the electronic equipment would be excessive. In this embodiment at these temperatures approximately ten watts of heat energy now flows through the thermal switch. The vapor flow to sustain this power transfer level is approximately 0.68 lb/hr for freon F-113. The pressure drop through the wick at this flow is negligible. The internal thermal impedance, which is a function of watts/in$^2$ at the surface of condenser plate 18 and evaporator plate 17, is also negligible. The major thermal impedance in the device is at the interface between the surfaces of plates 11 and 17. This impedance is greatly reduced immediately after contact with plate 11 is made by plate 17, since plate 11 is at approximately 125°C, and the temperature within the bellows raises further. Thus, at this operating level of the switch a pressure of approximately 100PSIA results in producing an interface impedance (between plates 17 and 11) of approximately 0.25°C/in$^2$/watt, providing in this particular embodiment, approximately 1.5°C across the interface at 10 watts. The thermal switch thus provides a thermal short for heat flow from the electronic equipment mounted on plate 11 to the heat sink, plate 12, during an emergency condition when the temperature of the heat sink is higher than normal. It will provide an additional degree of control up to a cold plate temperature of approximately 120°C with approximately a 10-watt thermal flow at a temperature differential of approximately 5°C. (The heater power for maintaining the electronics at 125°C is gradually reduced to zero during this phase of operation.)

The device disclosed provides for faster warm-up of the electronic equipment and less heater power required to maintain the electronic equipment at its operating temperature since the impedance across the device (between the electronic equipment hot plate and the heat sink) is very high, for normal temperatures of the heat sink. In an emergency condition when the heat sink temperature becomes high the device provides substantially a thermal short (negligible impedance) to the heat sink before the temperature of the electronic equipment has had opportunity to elevate in temperature. (Prior art devices depend upon the temperature of the hot plate for control instead of the cold plate.) The device is highly damped by virtue of the thermal mass associated with each contact surface and does not exhibit any tendency toward oscillation, since once the temperature of the heat sink has returned to a normal temperature, pressure on the hot plate decreases increasing the thermal impedance between plates 11 and 17 further decreasing the temperature within the bellows which results in a rapid opening of the thermal switch until the next emergency (dash manuever).

The volume of refrigerant in the liquid state in the bellows at the 10 watt power level is not critical. The factors which would limit the operation of the device are the replenishment rate necessary to support the power level which in a typical embodiment, as being described, is approximately 0.6 lb/hr, an easily sustainable flow at the low pressure drop, and a burnout limitation which for F-113 is approximately 110 w/in$^2$ peak flux. This is much greater than the approximately 5.6 w/in$^2$ rate at the 10 watt condition under the aforementioned operating condition.

We claim:

1. A thermal switch for providing a flow of heat from a heat source to a heat sink at a predetermined temperature of the heat sink comprising:
   a. an expansible bellows having a fixed end plate and a movable end plate the said bellows and end plates defining a sealed expansible chamber;
   b. an expansible wick positioned within the said bellows in thermal contact with the said end plates and communicating therebetween;
   c. a refrigerant positioned within the said expansible chamber; and
   d. means for positioning the said bellows with the said attached end plates between the said heat source and the said heat sink with the said fixed end plate thermally attached to the said heat sink and the said movable end plate in spaced apart relationship to the said heat source at temperatures of the said heat sink below the said predetermined temperature whereby the said movable end plate will move into thermal contact with the said heat source at temperatures of the said heat sink above the said predetermined temperature.

2. The thermal switch as claimed in claim 1 wherein the said refrigerant is freon.

* * * * *